Patented Feb. 4, 1930

1,745,464

UNITED STATES PATENT OFFICE

FRANZ WEVER, OF DUSSELDORF, GERMANY, ASSIGNOR TO KAISER-WILHELM INSTITUT FÜR EISENFORSCHUNG, OF DUSSELDORF, GERMANY

PROCESS FOR THE PURIFICATION OF METALS

No Drawing. Application filed January 18, 1927, Serial No. 161,958, and in Germany January 27, 1926.

Processes have long been known and in use in metallurgy for the removal of undesirable admixtures from metals and alloys by allowing slags of suitable chemical composition to act on them. In these processes the impurities are partially converted into gaseous volatile compounds, or are fixed directly to the slag chemically, say by the addition of substances for which they posses a higher affinity than for the fundamental metal, being first converted into an easily removable intermediate substance and afterwards transferred to the slag.

The efficiency of these methods was mainly determined in practice by the fact that the dominant operations take place as heterogeneous reactions in two phases only at the surface of contact between the bath of metal and the slag. As however in furnaces of the well known types the metal and the slag lie comparatively motionless one on the top of the other, the rate of diffusion is determinate for the progress of the reaction in a much higher degree than the natural velocity of reaction of the various chemical processes taking place, the differences in concentration within the bath and the slag corresponding with the velocity of diffusion. This velocity of diffusion is however frequently undesirably low. When the concentration and temperature decrease it is always very small, so that the last residues of the impurities can only be removed very slowly if at all. The resulting disadvantages which affect the economy of the process and the quality of the products are obvious.

Repeated attempts have been made to cause turbulence within the fluid mass by setting the bath or the entire furnace in motion mechanically, or by artificially causing an evolution of gas, or to increase the velocity of the reaction by raising the temperature. These attempts have however only been successful in a few cases.

It is also known that in induction furnaces in consequence of the ponderomotive force of the induced currents, movements are set up within the metal bath. These movements can only act imperfectly in the narrow annular hearth of low frequency induction furnaces, whereby they have no effect upon the metallurgical operations. These low frequency induction furnaces do not therefore differ greatly in respect to the velocity and completeness of the slag reactions, from other types of furnace in which the bath is motionless. On the other hand, they are inferior in operation owing to the low temperature of the slag and have therefore not met with such a demand as furnaces of the arc type that have been continually improved. On the other hand, the views held as to the effects of movement of the bath on the separation of suspended impurities still differ widely. Thus it is considered that electric-steel does not acquire the quality of crucible steel because the unavoidable movement of the bath prevents a perfect separation of the oxides.

In the high frequency induction furnaces the turbulence of the bath of metal is noticeable to a much greater degree than in the low frequency furnaces, on account of the restriction of the smelting hearth area. Its more favourable effects on the thorough mixing of alloys has been repeatedly observed.

The high frequency induction furnaces have hitherto been exclusively used for melting down or running down pure metals. Numerous examples can be given indicating that even in cases where the use of impure charges and subsequent refining by means of suitable slags would have been obvious, the advantages of movement of the bath for refining purposes were never recognized, and therefore high grade pure raw materials were simply melted or run down without any regard to subsequently influencing the degree of purity.

The use of the well known high frequency inductance furnaces for refining work for the purpose indicated, namely, the removal of undesirable admixtures from impure charges by allowing slags of suitable chemical composition to react with them, and if necessary by conversion of the impurities into more easily removable intermediate substances, by the addition of substances for which they possess a greater affinity than they do for the fundamental metal, is based on the idea of utilizing the motion of the bath metallurgically, also for improving the action of the slag and therefore the quality of the product obtained. This idea is based on the knowledge obtained from systematic experiments and which show that the movement of the bath in high frequency induction furnaces of the kind herein mentioned have unexpected effects which fundamentally alter metallurgical theory. These results involve an order of magnitude of velocity of movement in the bath and completeness of the slag reactions hitherto unattained. The vigorous movement in the bath produces a coagulation of the highly dispersed components formed in the bath of metal by reaction of the added substances with the impurities to be removed, so that if the composition of the slag be correct they can be very rapidly and completely separated therein, thus for example oxygen in an iron melt is very rapidly replaced by added manganese or silicon. The high frequency induction furnace thus, contrary to the much represented view as to the deleterious action of movement in the bath on the separation of the impurities distributed through it, is capable of yielding the highest degree of purity by means of the slag reactions and that moreover by reason of the more efficient movement of the bath than in the types of electric furnaces hitherto used.

That the proposed method of refining metals constitutes an extremely important technical advance will be more fully illustrated by the examples hereafter set forth, limited to the production of steels. The object of these examples is to show that by the new method of operating, not only is a considerable increase in the quality of known products obtained, but entirely new methods of production are rendered possible, which cannot be carried out in the apparatus hitherto used.

The increase in the velocity of refining by the vigorous movement of the bath of the induction furnace having no iron core, may first be utilized to remove the undesirable substances in association with iron, having a higher affinity for oxygen, much more quickly and more completely from the charge than is possible with the smelting apparatus hitherto known. Thus it has been possible in carrying out the method of the invention to obtain an iron with only about 0.04% of total impurities consisting of carbon, silicon, manganese, phosphorus and sulphur, and therefore considerably to surpass the hitherto known degree of purity.

The improvement obtained is still further increased by the fact that the partial oxidation of the fundamental metal which is unavoidable in the refining treatment, can be again made retrogressive much more completely than hitherto. Owing to the vigorous movement in the bath the reaction of the oxygen combined with iron, with the deoxidizing agents added takes place very quickly and the de-oxidation products formed as the result can therefore, if the slag be of the appropriate composition, be rapidly and completely combined therewith. The rapidity of these operations therefore permits of the oxygen being washed out of the bath of metal in such a way that after a comparatively large addition of the deoxidizing agent, the smelting is stopped in the moment the main quantity of the oxygen is fixed, and transferred to the slag. Thus steel produced with the very low carbon content of 1.01% were, notwithstanding the low content of deoxidizing agents,—0.13% to 0.17% of Mn and 0.15% to 0.22% of Si, very free from red shortness. They could be used on a manufacturing scale with a very small proportion of waste for rods and fine sheets. A sample treated cold at a high rate of speed was still completely satisfactory after being rolled down by 90% to 0.22 mm. without any intermediate annealing. The testing of the annealed sheet strips on the Erichsen apparatus gave depth values which were all considerably above the normal curve laid down by Erichsen. A similar material containing 0.01% C, 0.46% Mn and 0.22% Si could be rolled into tubes in a perfectly satisfactory manner on a manufacturing scale in a Stiefel rolling mill.

Carbon steels produced according to the new process yielded even in the preliminary experiments quality numbers in the multiple hardening which not only equalled the figures of selected commercial steels but in some respects considerably surpassed them.

In like manner fused iron-chromium alloys could be further worked in all cases with a surprising ease hitherto unattainable. Thus for example, the expenditure of labour for the hot rolling of a chrome-iron containing 0.02% C and 12.67% Cr, was only two-thirds that required for a malleable iron rolled under similar conditions. In the case of a chromium-nickel steel containing 1.1'% of C, and 1.45% of Cr, the small expenditure of power was surprising when drawing. The same steel could be rolled out in a tube rolling mill without difficulty, the amount of power required being about 10% less than that required for a first class commercial product treated under exactly similar conditions.

The possibilities of development resulting from the new process are indicated by the following examples:—

The manufacture of the chromium alloys and nickel alloys required for various purposes and containing small quantities of carbon is at the present time only possible with very great expense, as the chromium and nickel low in carbon which are alone concerned as the addition to the alloy, or the intermediate alloys of these metals low in carbon are very costly and subsequent influencing of the degree of purity by the well known processes without simultaneous oxidation and consequent impairing of the qualities of the material is not possible. Practical experiments have conclusively demonstrated that a new method of working can be developed on the principle of the vigorous turbulence of the bath of metal in the ironless induction furnace, which permits the demands made on the degree of purity of the raw materials to be considerably reduced. Thus in a practical example a low carbon iron-chromium alloy was produced by first alloying a ferro-chromium containing 4.8% C and 64.9% Cr with a bath of iron, and subsequently removing the carbon by refining with hammerslag. Immediately after the addition of the chromium the melted mass contained 1.04% C and 14.5% Cr; after refining, the carbon had dropped to 0.16% and the chromium to 13.42%. The product could be worked on a manufacturing scale in a satisfactory way and rolled into tubes in a Stiefel rolling mill, and therefore it is notwithstanding the refining treatment even under severe conditions perfectly free from red shortness. This proves that the chromium-nickel alloys which are highly sensitive to oxygen can be subjected in ironless induction furnaces to a refining treatment without being greatly burned away, the metallurgical properties of this furnace ensuring at the same time a thorough de-oxidation with a suitable method of working.

In the metallurgy of pure nickel the refining of impure charges by means of slags of suitable composition has not so far been found to be possible. The reason for this is that by the means hitherto available for the purpose, the slow and incomplete progress of the metallurgical reactions between the slag and the bath rendered it impossible to prevent the bath with certainty from becoming supersaturated with oxygen or to make it retrogressive again. In view of the high sensitiveness of nickel this resulted in the properties of the material being badly impaired. The metallurgical treatment of nickel is limited for this reason to the re-smelting of a very pure intermediate product without any appreciable effects on its composition.

Experiments have led to the development of a new method of working on the basis of an induction furnace having no iron, which permits of crude nickel being purified metallurgically and consequently greatly to reduce the total cost of production and treatment. The new process is more fully described in the following example:—

In re-melting a very pure Mond nickel by the method of working customary at the present day in the metallurgy of nickel, the following analysis was obtained: 98.86% Ni+CO, 0.04% Si, 0.013% C, 0.72% Fe, 0.15% Mn, 0.052% Mg, 0.29% S, 0.142% Cu.

In refining according to the invention, on the contrary, a highly impure nickel containing both carbon and sulphur was run down in an ironless induction furnace and treated subsequently by the developed process. This consists in first carrying out a vigorous refining by the aid of an oxidizing lime and fluorspar slag and the addition of nickel oxide. In this treatment all the elements having a higher affinity for oxygen than the fundamental metal are highly oxidized and combined with the slag. In addition the excess of oxygen which is present as nickel oxide under a thick layer of lime and fluorspar slag, is combined by the addition of manganese, silicon or other de-oxidizing agent with these latter, and washed out into the slag by the vigorous movement of the furnace. The final analysis gave the following composition: 99.44% Ni, 0.004% Si, 0.01% C, 0.19% Fe, 0.09% Mn, 0.093% Mg, 0.012% S, 0.03% Cu, Al being absent.

The degree of purity of the merely re-melted pure nickel is thus greatly surpassed.

The nickel refined in an induction furnace having no iron can be satisfactorily forged and rolled.

I claim:—

1. Process for refining metals and alloys carried out in a high frequency induction furnace consisting in smelting the metal with slags which under the conditions of temperature and turbulence in which the smelting is carried out in the said furnace have a greater affinity for impurity than the fundamental metal and imparting high turbulence to the metal and slag under the conditions usual in a high frequency induction furnace.

2. In process specified in claim 1 the addition to the melt of a slag forming substance that is adapted under the conditions of high turbulence imparted to have a greater affinity for impurity than the fundamental metal.

3. In process specified in claim 1 the addition to the furnace charge of a deoxidizing agent.

FRANZ WEVER.